May 25, 1971   J. R. HAMILTON   3,580,711
SPRAYING MECHANISM FOR GLASSWARE FORMING MACHINES
Filed Aug. 5, 1968   4 Sheets-Sheet 1
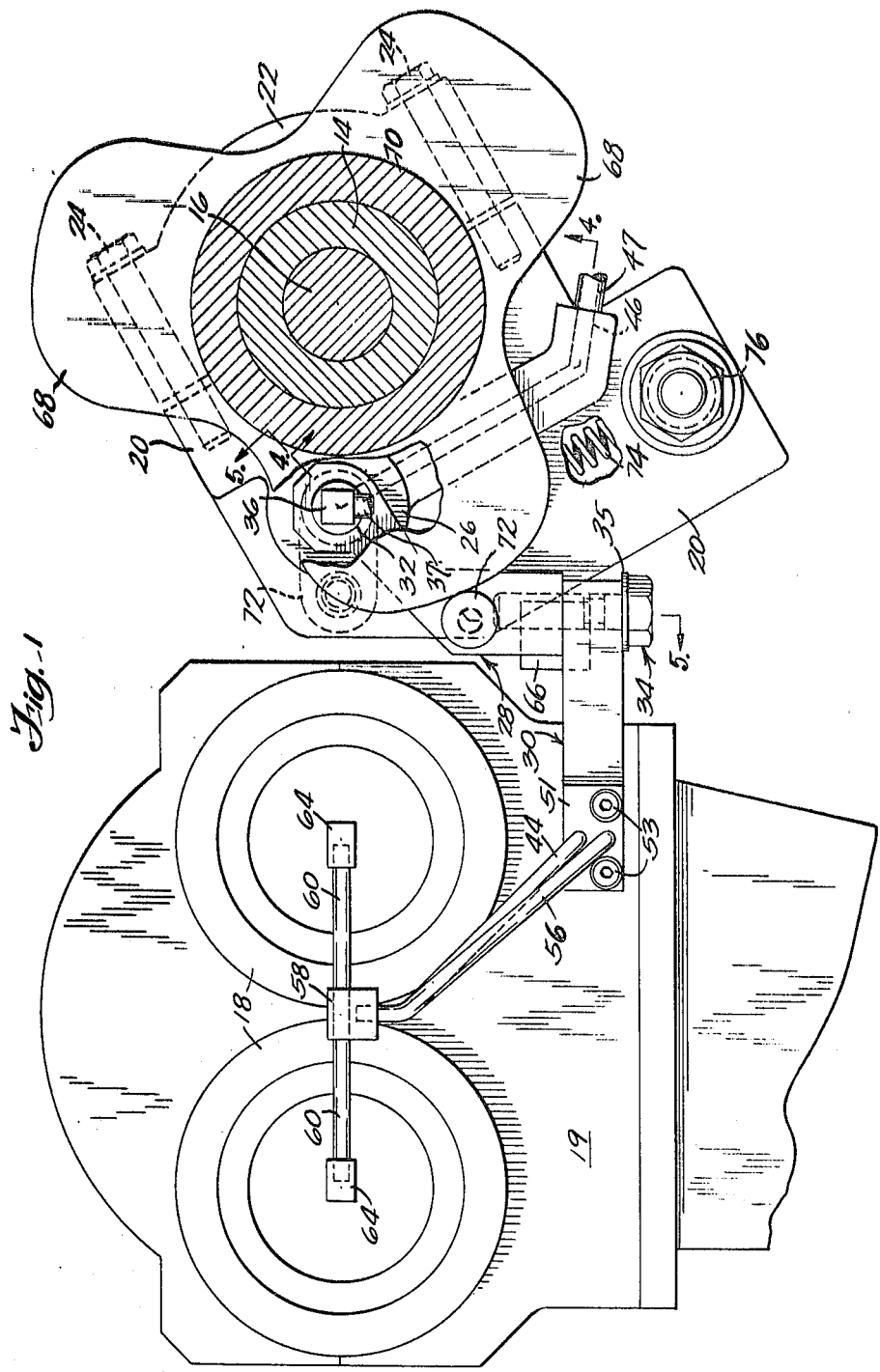
INVENTOR
Joseph R. Hamilton
BY Bair, Freeman
& Molinare
ATTORNEYS

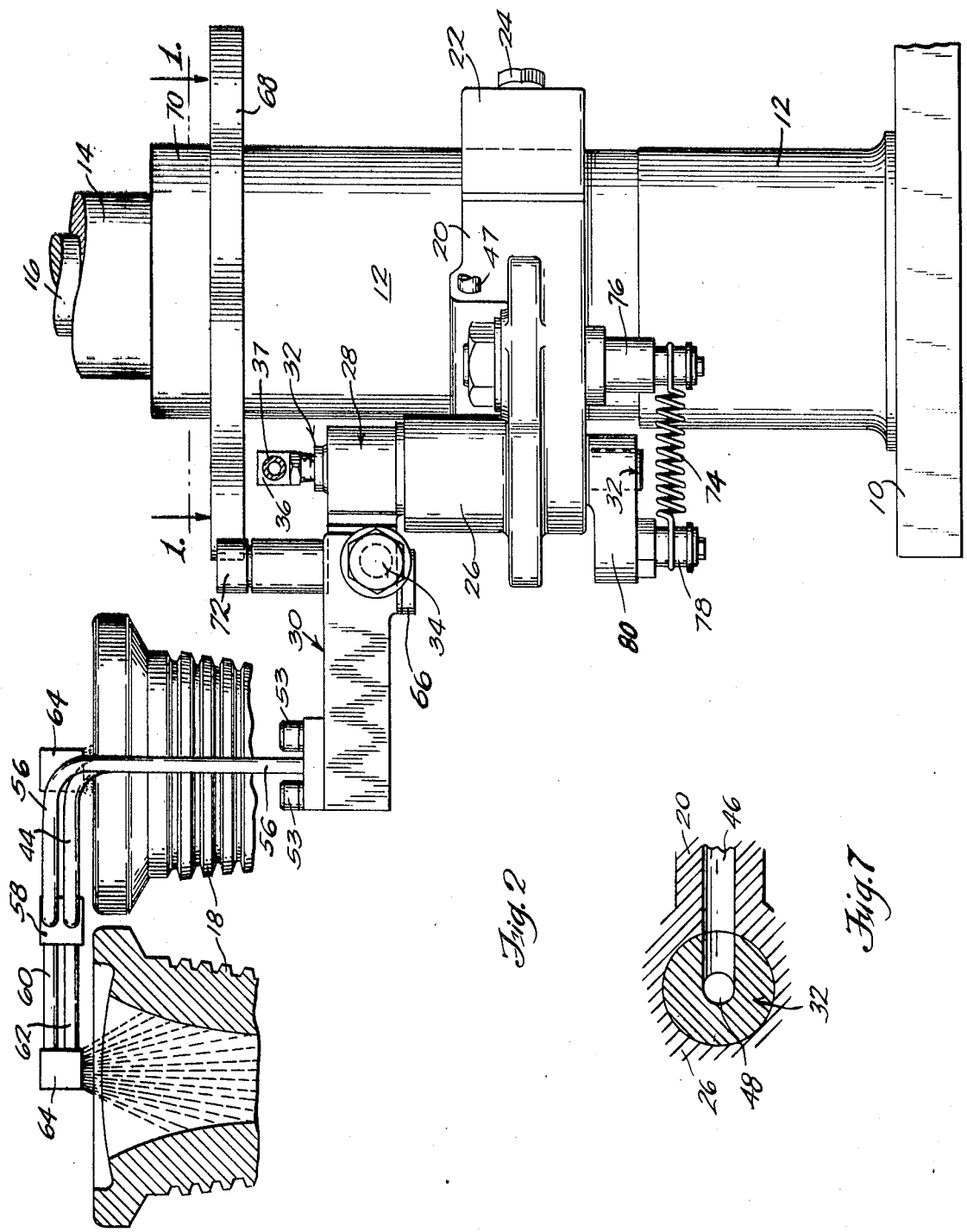

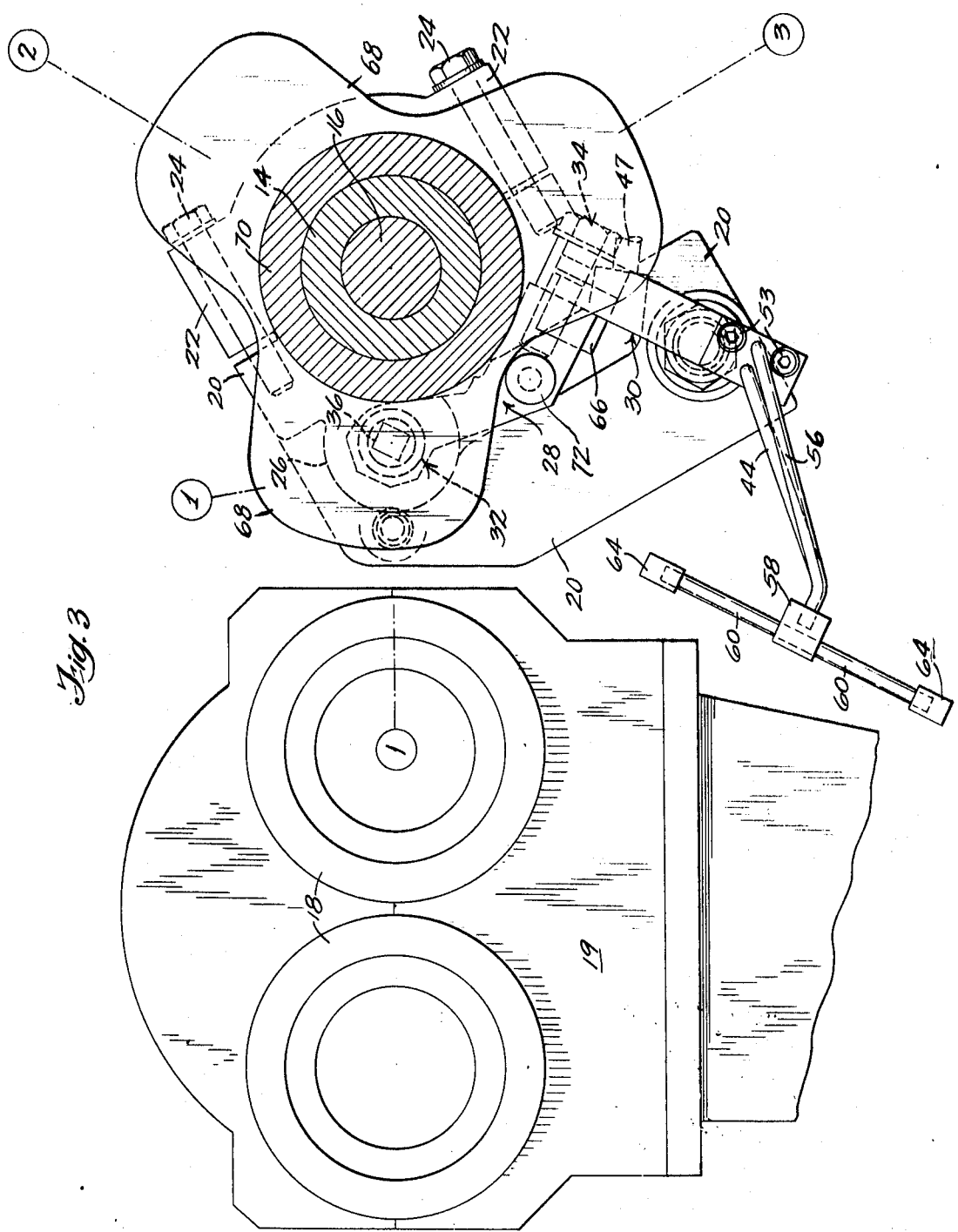

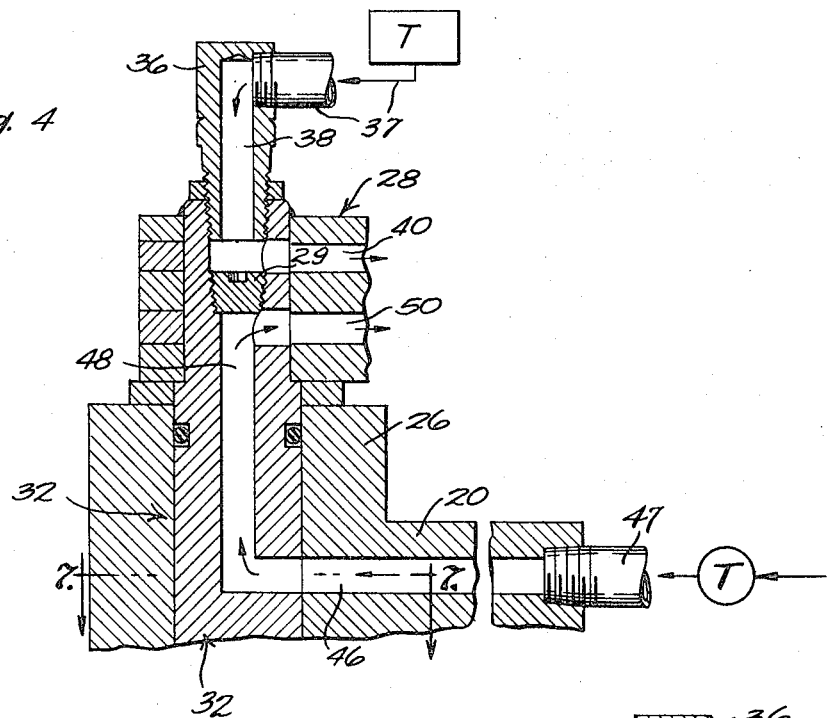
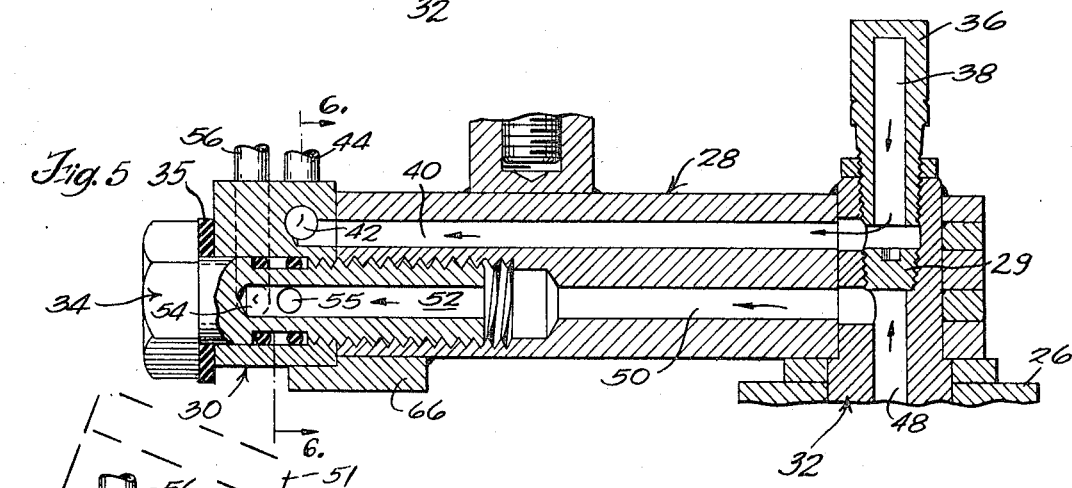
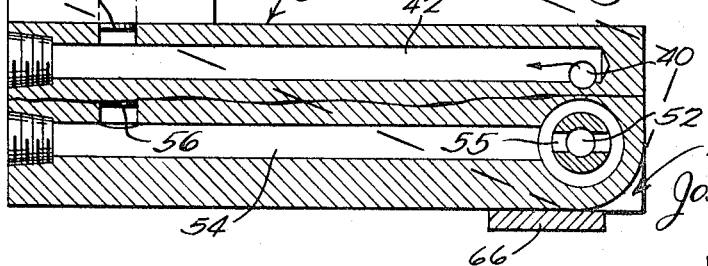

United States Patent Office 3,580,711
Patented May 25, 1971

3,580,711
SPRAYING MECHANISM FOR GLASSWARE
FORMING MACHINES
Joseph R. Hamilton, Anderson, Ind., assignor to
Lynch Corporation, Anderson, Ind.
Filed Aug. 5, 1968, Ser. No. 750,133
Int. Cl. C03b 39/00
U.S. Cl. 65—169                                    12 Claims

ABSTRACT OF THE DISCLOSURE

Spraying mechanism for solid parison blanks wherein spray nozzles are mounted on an arm so that they can be located over parison blanks during the spraying operation and swung to a remote location therefrom during the parison pressing operation. Cam and roller means are provided for swinging the arm, and the arm is of dual character so that damage to the arm during certain operations is eliminated by reason of a secondary part of the arm being swingable upwardly out of the way if struck by an obstruction.

BACKGROUND OF THE INVENTION

The Youkers Pat. No. 2,874,516 and the Hamilton Pat. No. 3,060,707 disclose three-neck ring types of glassware forming machines having a three-station indexing turret arrangement for carrying the neck rings. At a blank station of the machine, spraying is desired from a position which would interfere with the press plunger. My invention is designed to cope with this situation.

BRIEF SUMMARY OF THE INVENTION

A bracket is mounted on a turret housing and has pivoted thereto a spray arm provided with spray nozzles which can be swung to a position over parison blanks for spraying them, and to a position out of the way while press plunger-forming the parison. A cam is carried by the turret and coacts with a roller on the spraying arm to automatically swing it into and out of operative spraying position.

One object of the invention is to provide spraying mechanism which is readily adaptable as an attachment to an existing glassware forming machine of the Youkers or Hamilton type, and which includes a stationary turret housing in which a turret shaft is intermittently rotatable in indexing manner. For this purpose a split bracket is provided to clamp on the housing and support the spraying mechanism, and movable parts of the spraying mechanism are automatically moved by means of a cam mounted on the indexing turret shaft.

Another object is to provide a spray head supporting arm pivoted on the bracket in such manner that oil for the spraying operation, and compressed air for atomizing the oil as it leaves spray nozzles, may be supplied to the bracket and flow through passages in the arm to the spray nozzles.

Still another object is to provide spring means biasing the supporting arm in one direction, and a roller carried by the arm and biased toward the turret shaft by the spring means and thereby into contact with the surface of a cam mounted on the indexing turret shaft.

A further object is to provide a joint in the supporting arm so that a secondary portion of the arm may normally be positioned relative to a primary part of the arm for proper spraying of the parison blanks, but upon being struck by an obstruction will swing up out of the way instead of the arm being broken or damaged, especially during adjustments of the spraying mechanism to suit the particular parison blanks of the glassware forming machine which from time to time are changed as to size and shape, etc. when different runs of glassware are required.

With these and other objects in view, my invention consists in the construction, arrangement and combination of the various parts of my spraying mechanism, whereby the objects above contemplated are attained, as hereinafter more fully set forth, pointed out in my claims and illustrated in detail on the accompanying drawings.

BRIEF DESCRIPTION OF THE DRAWINGS

FIG. 1 is a partial plan and partial sectional view of a spraying mechanism for glassware forming machines, showing it associated with double cavity blanks or molds and in the mold-spraying position as taken on the line 1—1 of FIG. 2.

FIG. 2 is a side elevation thereof looking upward at FIG. 1.

FIG. 3 is a plan view similar to FIG. 1 showing the spraying mechanism in non-spraying position as when parisons are being pressed in the molds.

FIG. 4 is a sectional view on the line 4—4 of FIG. 1, showing air and oil passageways leading to a primary arm.

FIG. 5 is a sectional view on the line 5—5 of FIG. 1 showing the primary arm and the mounting of a secondary arm thereon, together with connecting oil and air passageways.

FIG. 6 is a sectional view on line 6—6 of FIG. 5 showing the oil and air passageways in the secondary arm.

FIG. 7 is a sectional view on the line 7—7 of FIG. 4 to show a porting arrangement for the primary arm.

On the accompanying drawings, I have used the reference numeral 10 to indicate a case of a glassware forming machine such as one of the type shown in the Youkers and Hamilton patents. This type of glassware forming machine includes a vertical-axis indexing turret 14 rotatable within a turret housing 12, the shaft 14 being hollow and rotatable on a stationary vertical shaft 16.

Solid parison blanks or molds 18 are illustrated in FIG. 2, at a blow station (1) which is designated with the 1 inside a circle in FIG. 3, and there are also a blow station (2) and a take-out station (3), the three stations being 120° apart. The solid parison blanks 18 are supported by a blank support 19.

During the operation of the glassware forming machine, three openable neck rings are supported by the turret and move progressively from station to station during each operating cycle of the machine. At station (1) gobs of glass are dropped into the parison blanks 18 (two of them being shown for double gobbing or dual cavity operation for economy of production), and plungers press the parisons to shape in the blanks 18. The neck rings then move to station (2) where the finished ware is blown to shape and then move the finished ware to the take-out station (3) where the neck rings are opened and the finished ware deposited on a deadplate for delivery to a take-away conveyor leading to the annealing lehr.

To avoid sticking of the ware to the blank 18 it is desirable to spray oil into the blanks periodically, either every cycle or every second or third etc. cycle as required. The spray is suitably controlled by a glassware forming machine timer in the usual way. Since the spray nozzles must be out of the way during the time that the press plunger enters the parison blank, provision must be made for accomplishing this and the following described mechanism comprises my present invention for doing so.

A supporting bracket 20 is provided which together with a clamp yoke 22 and clamp screws 24 provide a means for affixing the bracket 20 with respect to the turret housing 12. A hub 26 extends upwardly from the supporting bracket 20, and a primary arm 28 is pivoted thereon, a secondary arm 30 being pivoted to the primary arm 28. A vertical pivot shaft 32 forms part of the primary arm 28, and is oscillatable in the hub 26, suitable O-ring type seals being provided to avoid leakage of air during the pivoting action. A horizontal pivot stud 34 provides the pivoting means for the secondary arm 30 relative to the primary arm 28. As shown in FIG. 5 the pivot stud 34 holds the secondary arm 30 against the flat left end of the secondary arm, the surfaces being a snug working fit to avoid oil and air leakage, a gasket 35 also aiding in this respect.

Referring to FIGS. 4 and 5, an oil receiving fitting 36 is screwed into the top of the pivot shaft 32 and has an oil passageway 38 leading to an oil passageway 40 in the primary arm 28. Oil is supplied thereto by gravity as through a supply pipe 37 from a tank T shown diagrammatically in FIG. 4. As shown in FIG. 5 the passageway 40 connects with a passageway 42 in the secondary arm 30 and an oil pipe 44 communicates therewith as shown in FIG. 6. The bracket 20 has an air passageway 46 therein receiving air as through a supply pipe 47 from a timer T (which is the usual glassware forming machine timer) and supplies air only at the appropriate times as will hereinafter be explained.

The air passageway 46 communicates with an air passageway 48 in the vertical pivot shaft 32 and is separated from the oil passage 38 by a plug 29 shown in FIGS. 4 and 5. The passageway 48 communicates with an air passageway 50 in the primary arm 28 which as shown in FIGS. 5 and 6 communicates with an air passageway 52 of the horizontal pivot stud 34. The passageway 52 communicates by means of an air passageway 54 with an air pipe 56, a cross hole 55 being provided in the stud 34 for this purpose.

The oil and air pipes 44 and 56 extend to a head 58 from which air pipes 60 and oil pipes 62 diverge for carrying the air and oil to spray nozzles 64 on the outer ends of the pipes 60 and 62. Thus, as shown in FIGS. 1 and 2, the spray nozzles 64 may spray oil into the parison blanks 18 at one time, and at another time as in FIG. 3 are out of alignment therewith to permit entry of the press plungers into the parison blanks. The spray nozzles 64 are of the atomizing type wherein oil entering the nozzle is atomized and sprayed from the nozzle by the slug of compressed air supplied to the supply pipe 47 at the proper time in the glassware forming machine cycle and for the proper duration.

In FIGS. 5 and 6 a stop flange 66 is illustrated to stop the secondary arm 30 in a horizontal position yet permit it to be pushed up as to the dash-line position shown in FIG. 6 in the event some obstruction strikes the secondary arm 30 as when changing blanks or during malfunctioning of the glassware forming machine. This arrangement eliminates breakage of the spraying mechanism and permits the primary arm to be swung down again to its proper position against the stop flange 66 when the machine is again ready to operate.

The spraying arm, that is the primary arm 28 and the secondary arm 30, are swingable together as a unit on a horizontal axis (the axis of the vertical pivot shaft 32). In order to do this automatically, that is swing the spray nozzles from the operative position of FIG. 1 to the inoperative position of FIG. 3 and back again each cycle of operation of the glassware forming machine, I provide a three-lobed cam 68 secured as by its hub 70 to the turret 14. The primary arm 28 carries a roller 72 adapted to engage the lobes of the cam. To constantly keep the roller in contact with the cam, I provide a spring 74 connected at one end to a stationary stud 76 depending from the bracket 20 and a stud 78 on the outer end of an arm 80 secured to the lower end of the vertical pivot shaft 32, the shaft projecting from the lower surface of the bracket as shown by dotted lines in FIG. 2 for this purpose.

During operation of the glassware forming machine, the turret 14 is indexed 120° at the time, and since it is desirable to spray during the indexing cycle as shown in FIG. 1 and have the spray at rest during the blank forming or pressing part of the cycle, the cam 68 is so set as shown in FIG. 3 that the roller 72 is on the top of the lobe of the cam during the indexing cycle, and on the low part of the lobe as in FIG. 3 during the blank-forming part of the cycle. Therefore it is necessary to set the cam at the proper angle on the turret to accomplish the spraying operation when the parts are in the FIG. 1 position at which time the glassware forming machine timer T is delivering air to the spraying mechanism and the spray is being discharged as shown in the left hand blank 18 of FIG. 2. The clamp yoke 22 and the clamp screws 24 are manipulated in an obvious manner to accomplish the desired adjustment around the turret housing 12 in an obvious manner.

I claim as my invention:

1. A spraying mechanism for glassware forming machines of the type having a blank station where the parisons are pressed in a parison mold and a vertical-axis indexing turret for moving the parison to a blow station and for thereafter moving the blown ware to a take out station, said mechanism comprising, in combination, a fixed support, on said turret, an arm pivotally supported on said fixed support on a vertical axis, an atomizing nozzle carried by said arm and movable thereby to first and second positions, said first position being over a parison mold for a mold spraying operation and said second position being removed from the parison mold during a parison press forming operation, means for supplying air and oil to said atomizing nozzle and including passageways through said arm, and means for moving said arm between said positions and including a cam carried by said turret for coacting with said arm to cause the desired movement.

2. Spraying mechanism in accordance with claim 1 including a roller carried by said arm, and spring means biasing said arm in a direction to maintain said roller in contact with said cam during rotation of said turret.

3. Spraying mechanism in accordance with claim 2 wherein said cam has a lobe corresponding to each of said blank, blow and take-out stations.

4. Spraying mechanism in accordance with claim 1 wherein said arm includes a primary arm pivotally supported on said vertical axis, and a secondary arm pivotally supported on a horizontal axis on said primary arm.

5. Spraying mechanism in accordance with claim 4 wherein means is provided to limit the downward pivoting of said secondary arm relative to said primary arm, while permitting upward pivoting thereof if struck by an obstruction.

6. Spraying mechanism in accordance with claim 1 including a stationary housing for said turret, first and second portions on said fixed support for surrounding said housing, and means for clamping said portions around said housing.

7. Spraying mechanism in accordance with claim 1 including a bracket for fixing said support to said turret, said vertical axis for said arm comprises a vertical pivot shaft extending from said arm and rotatable in said fixed support, a lateral air passage in said bracket leading to said vertical pivot shaft, said vertical pivot shaft having a port to receive air from said lateral air passageway only when said arm is in said position over a parison mold.

8. Spraying mechanism in accordance with claim 7 wherein the supply of air to said lateral air passage is timer-controlled for spraying operation only when said arm is in position for spraying a parison in the parison mold.

9. A spraying mechanism for glassware forming machines of the type having a blank station where the parisons are pressed in a parison mold, and a vertical-axis indexing turret for moving the parison to a blow station, and for thereafter moving the blown ware to a take-out station, said mechanism comprising, in combination, a housing for said turret, a split bracket surrounding said housing in which the indexing turret is rotatable, means for clamping said split bracket thereon, an arm pivotally supported by said split bracket, an atomizing nozzle carried by said arm and movable thereby to one position over a parison mold for a mold spraying operation, and another position removed from the parison mold during a parison press-forming operation, means for supplying air and oil to said atomizing nozzle including passageways through said arm, and means for selectively moving said arm to said positions in response to indexing rotation of the turret.

10. Spraying mechanism in accordance with claim 9 wherein said moving means comprises a cam carried by the indexing turret and a roller carried by said arm, said cam including lobes, and spring means biasing said arm in a direction to engage said roller with the lobes of said cam during rotation of the turret.

11. Spraying mechanism in accordance with claim 10 wherein said cam has a lobe corresponding to each of said blank, blow and take-out stations.

12. Spraying mechanism in accordance with claim 9 wherein said arm includes a primary arm, and a secondary arm pivotally supported on a horizontal axis on said primary arm.

References Cited

UNITED STATES PATENTS

| | | | |
|---|---|---|---|
| 2,410,422 | 11/1946 | Breene et al. | 65—169 |
| 3,141,752 | 7/1964 | Keller | 65—25 |

S. LEON BASHORE, Primary Examiner

S. R. FRIEDMAN, Assistant Examiner

U.S. Cl. X.R.

65—26, 181